US012173488B2

(12) United States Patent
Burns

(10) Patent No.: US 12,173,488 B2
(45) Date of Patent: Dec. 24, 2024

(54) CONTROLLER

(71) Applicant: KOHLER MIRA LIMITED, Cheltenham (GB)

(72) Inventor: Richard Harcourt Burns, Cheltenham (GB)

(73) Assignee: KOHLER MIRA LIMITED, Cheltenham (GB)

( * ) Notice: Subject to any disclaimer, the term of this patent is extended or adjusted under 35 U.S.C. 154(b) by 216 days.

(21) Appl. No.: 17/817,508

(22) Filed: Aug. 4, 2022

(65) Prior Publication Data

US 2022/0372739 A1 Nov. 24, 2022

Related U.S. Application Data

(63) Continuation of application No. PCT/GB2021/050547, filed on Mar. 5, 2021.

(51) Int. Cl.
*E03C 1/05* (2006.01)
*H01H 1/14* (2006.01)

(52) U.S. Cl.
CPC ................ *E03C 1/05* (2013.01); *E03C 1/052* (2013.01); *E03C 1/055* (2013.01); *H01H 1/14* (2013.01)

(58) Field of Classification Search
None
See application file for complete search history.

(56) References Cited

U.S. PATENT DOCUMENTS

| | | | | |
|---|---|---|---|---|
| 6,573,466 B1 * | 6/2003 | Rapp | H01H 13/063 200/302.2 |
| 7,145,091 B1 * | 12/2006 | Wang | H01H 23/065 200/302.1 |
| 10,749,292 B2 * | 8/2020 | Mortun | H02G 3/14 |
| 2010/0294641 A1 * | 11/2010 | Kunkel | E03D 5/105 200/600 |
| 2017/0213670 A1 * | 7/2017 | Okano | G05G 25/04 |

FOREIGN PATENT DOCUMENTS

| | | | | |
|---|---|---|---|---|
| CN | 207852540 U | 9/2018 | |
| DE | 19704355 A1 * | 8/1998 | B60R 1/07 |
| DE | 19953046 A1 | 5/2000 | |
| DE | 102008034046 A1 | 1/2009 | |
| DE | 202016004151 U1 | 5/2017 | |
| GB | 2592212 A * | 8/2021 | E03C 1/05 |
| GB | 2603871 A * | 8/2022 | E03C 1/055 |
| JP | 07035200 U | 6/1995 | |
| JP | 2005078916 A | 3/2005 | |
| WO | WO-2016166283 A1 * | 10/2016 | H01H 13/86 |

OTHER PUBLICATIONS

Translation of DE-19704355-A1 (Year: 1998).*
International Search Report for International Application No. PCT/GB2021/050547, Sep. 16, 2021, 11 pages.

* cited by examiner

*Primary Examiner* — Umashankar Venkatesan
(74) *Attorney, Agent, or Firm* — Husch Blackwell LLP

(57) ABSTRACT

A controller is provided for use in a wet environment such as an ablutionary setting. The controller includes a base member, an input member, a seal extending between the input member and the base member, and a sealed internal volume defined at least partially by the base member, the input member, and the seal. The input member is moveable relative to the base member between a neutral position and a control position. The seal biases the input member towards the neutral position.

19 Claims, 12 Drawing Sheets

CONTROLLER

CROSS REFERENCE

This application is a continuation of and claims priority to PCT Application No. PCT/GB2021/050547, filed Mar. 5, 2021, which itself claims priority to Great Britain Patent Application No. 2003597.8, filed Mar. 12, 2020, the entireties of both of which are hereby incorporated by reference.

FIELD OF THE INVENTION

This disclosure relates to a controller for use in a wet environment such as an ablutionary setting. The disclosure also relates to fluid delivery systems, in particular plumbing or ablutionary systems, comprising such a controller.

BRIEF DESCRIPTION OF THE DRAWINGS

Example embodiments will now be described with reference to the accompanying drawings, in which.

DETAILED DESCRIPTION OF THE DRAWINGS

Figure 1A:
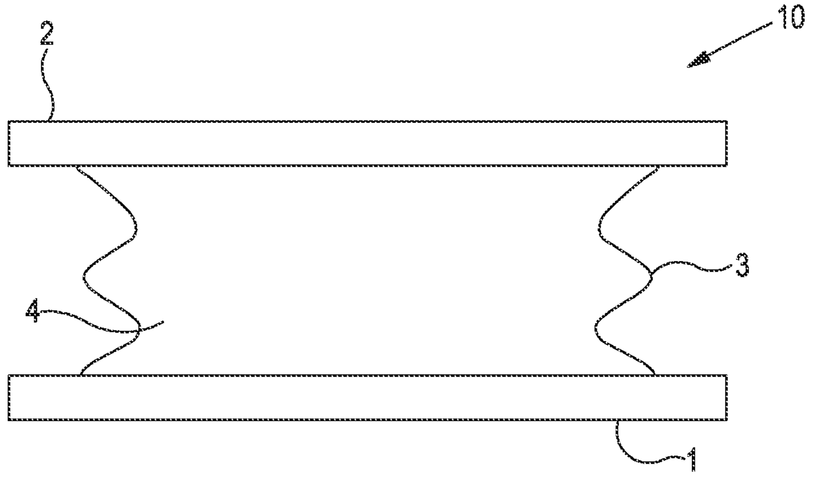
FIGS. 1*a* and 1*b* show schematic cross-sectional side views of a controller according to an embodiment.

Controllers for use in a wet environment, such as an ablutionary setting, are known to comprise an input which is moveable between positions in order to affect control of a fluid delivery system. For example, shower controllers are known to comprise an input which is moveable between positions in order to control a valve to permit or prevent a flow of water to a fluid delivery device, such as a showerhead.

After moving an input of a controller for use in a wet environment from a first position to a second position, it may be desirable for the input to automatically return to the first position. It may also be desirable for a controller for use in a wet environment to comprise a sealed internal volume, for example for housing parts of the controller which are not suitable for getting wet.

According to a first aspect, there is provided a controller for use in a wet environment such as an ablutionary setting. The controller comprises: a base member; an input member; a seal extending between the input member and the base member; and a sealed internal volume defined at least partially by the base member, the input member and the seal. The input member is moveable relative to the base member between a neutral position and a control position. The seal is configured to bias the input member towards the neutral position.

The first aspect provides a controller for use in a wet environment comprising a single component (the seal)

which provides two functions: automatically returning the input member to the neutral position after it has been moved to the control positon; and providing a sealed internal volume. This advantageously reduces the total number of components required to provide the controller by removing the need for a separate seal and biasing means. This in turn reduces manufacturing complexity and cost.

The input member may be moveable relative to the base member in a linear direction. The seal may be configured to bias the input member towards the neutral position in a linear direction. The controller may comprise a push button.

The controller may comprise a pivot joint configured to allow the input member to pivot relative to the base member from the neutral position to the control position. The pivot joint may be configured to allow the input member to pivot relative to the base member from the neutral position to a plurality of control positions. The pivot joint may be configured to allow the input member to pivot relative to the base member from the neutral position to two, three or four control positions. Up to 10 control positions may be provided. The pivot joint therefore enables a single input member to be used to provide multiple control functions. The controller may thus comprise a rocker switch, e.g. a two-way rocker switch, a three-way rocker switch or a four-way rocker switch.

In embodiments in which the controller comprises a plurality of control positions, the control positions may be spaced equidistantly from one another. For example, the input member may comprise a circular cross-section when viewed in plan, and the control positions may be spaced equidistantly about a circumference of a nominal circle arranged concentrically with the circular cross-section. In another example, the input member may comprise a square cross-section when viewed in plan, and the input member may be pivotable to a control position aligned with each corner of a nominal square arranged concentrically with the square cross-section.

The pivot joint may be configured to allow the input member to pivot relative to the base member about more than one axis. For example, the input member may be pivotable about two, three or four different axes. The pivot joint may be configured to allow the input member to pivot relative to the base member in a single direction about one or more axes, or in opposing directions about one or more axes. A single axis may therefore provide for one or two control positions. For example, three axes may provide three control positions, with the input member being pivotable in a single direction about each axis. Alternatively, three axes may provide six control positions, with the input member being pivotable in opposing directions about each axis. The pivot joint may be configured to allow the input member to pivot relative to the base member in any direction, i.e. about any axis.

In embodiments in which the pivot joint is configured to allow the input member to pivot relative to the base member about more than one axis, the axes may intersect at a point aligned with the centre of the input member. This may allow the input member to be moved to each of the control positions using a substantially equal input force, due to the substantially equal moment required to pivot the input member to each of the control positions. Alternatively, the axes may intersect at a point offset from the centre of the input member. This may vary the input force required to move the input member to one or more of the control positions, which may be desirable.

The controller may comprise an actuation point or a plurality of actuation points. The actuation point or at least one of the plurality of actuation points may be located at least partially within the sealed internal volume. The actuation point or at least one of the plurality of actuation points may be configured to be actuated by moving the input member to the control position or one of the control positions.

The actuation point or at least one of the plurality of actuation points may be mechanically coupled to a mechanical control portion. The mechanical control portion may comprise any suitable arrangement of mechanical components, such as an arrangement of levers and linkages. The controller may comprise all or part of the mechanical control portion, or the mechanical control portion may be entirely separate from the controller.

The controller may comprise an electronic switch. The actuation point or at least one of the plurality of actuation points may comprise an electrical contact of the electronic switch. The actuation point or at least one of the plurality of actuation points may comprise two electrical contacts of the electrical switch. The actuation point or at least one of the plurality of actuation points may comprise a first electrical contact of the electrical switch, and the input member may comprise a second electrical contact of the electrical switch. Moving the input member to the control position may cause the electrical contacts of the electrical switch to be brought into contact with one another.

At least partially locating the actuation point or at least one of the plurality of actuation points within the sealed internal volume may protect the or each actuation point from water damage in use.

The controller may comprise a first guide portion. The first guide portion may comprise a rib. The controller may comprise a second guide portion. The second guide portion may comprise a slot. The first guide portion may be fixed relative to one of the base member and the input member. The second guide portion may be fixed relative to the other of the base member and the input member. The rib may be received in the slot to inhibit lateral and/or rotational movement of the input member relative to the base member. The guide portions may help to ensure that a force applied to the input member by a user causes the input member to be moved to the desired control position, and mitigate any undesired movement of the input member.

The base member may comprise a guide portion. The input member may comprise a guide portion. One of the guide portion of the base member and the guide portion of the input member may comprise a rib. The other of the guide portion of the base member and the guide portion of the input member may comprise a slot. The rib may be received in the slot to inhibit lateral and/or rotational movement of the input member relative to the base member. The guide portions may be formed integrally with the base member and the input member respectively. Alternatively, one or both of the guide portions may be formed separately and attached to the respective base member and/or input member. The guide portions confer the same advantages as discussed in the preceding paragraph. Forming the guide portions integrally with the base member and the input member advantageously reduces the number of parts required to construct the controller.

The seal of any of the above described embodiments may extend continuously in a circumferential direction relative to the base member and the input member. The seal may comprise a unitary part, or may be formed of a plurality of parts bonded, or otherwise suitably attached, together.

The seal of any of the above described embodiments may comprise a C-shaped or S-shaped cross-section when the input member is in the neutral position. The force provided by the seal to bias the input member towards the neutral position may be a result of, at least in part, the cross-sectional shape of the seal. A C-shaped or S-shaped cross-section may help to provide a strong and reliable biasing force.

The seal of any of the above described embodiments may comprise a resilient material. The seal may comprise ethylene propylene diene monomer (EPDM) rubber or silicone. The force provided by the seal to bias the input member towards the neutral position may be a result of, at least in part, the material properties of the seal.

The material properties and/or the cross-sectional shape of the seal alone may be sufficient to provide the total biasing force required to return the input member to the neutral position from the control position or any one of the plurality of control positions.

In some embodiments, the seal may comprise a first flexible non-resilient material and a second resilient material. For example, the seal may comprise a flexible rubber with a resilient metal insert.

In some embodiments, the seal may comprise additional means to bias the input member towards the neutral position. For example, the seal may comprise magnetic materials configured to provide an opposing magnetic force.

The controller of any of the above described embodiments may comprise a spring configured to further bias the input member towards the neutral position. The spring may help to ensure that the input member is returned to the neutral position from the control position or any one of the plurality of control positions. In embodiments comprising a pivot joint, the spring may comprise a wave spring arranged coaxially with a pivot point of the pivot joint. In some embodiments, the spring may comprise a compression spring. In embodiments comprising a pivot joint and a compression spring, a longitudinal axis of the compression spring may be offset from a pivot point of the pivot joint. In some embodiments, the controller may comprise more than one spring.

The controller of any of the above described embodiments may comprise a housing. The base member may be fixed relative to the housing and the input member may be moveable relative to the housing. The housing may comprise an opening providing access to the input member. The housing may provide means for installing the controller at a point of use, e.g. attaching the controller to a mounting surface such as a wall.

According to another aspect, there is provided a fluid delivery system. The fluid delivery system comprises a fluid delivery device and a controller according to the present disclosure. The controller is operable to control one or more characteristics of the fluid delivered, in use, by the fluid delivery device.

The one or more characteristics of the fluid may comprise fluid flow and/or temperature.

The fluid delivery system may comprise a valve operable to control flow of fluid to the fluid delivery device. The controller may be operable to control the valve. In embodiments in which the controller comprises an actuation point or a plurality of actuation points, the actuation point or at least one of the plurality of actuation points may be operably connected to the valve.

The fluid delivery system may comprise a plurality of fluid delivery devices.

The controller may be configured to permit a user to select any combination of one or more of the fluid delivery devices.

The fluid delivery device(s) may comprise a sprayer, e.g. a shower head, or a faucet.

The fluid may be water.

The fluid delivery system may be coupled to a fluid supply, e.g. a plumbing system providing cold and/or hot water.

Except where mutually exclusive, any of the features of the first aspect may be employed mutatis mutandis in the second and other aspects.

Figure 1B:
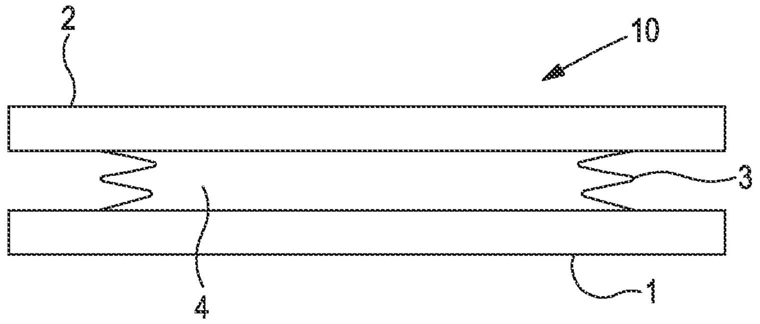

FIGS. 1*a* and 1*b* show schematic cross-sectional side views of a controller 10 for use in a wet environment, such as an ablutionary setting, according to an embodiment. The controller 10 comprises: a base member 1, an input member 2, a seal 3 extending between the input member 2 and the base member 1, and a sealed internal volume 4 defined by the base member 1, the input member 2 and the seal 3. The input member 2 is moveable relative to the base member 1 between a neutral position and a control position. The seal 3 is configured to bias the input member 2 towards the neutral position.

FIG. 1*a* shows the input member 2 in the neutral position and FIG. 1*b* shows the input member 2 in the control position. In the example of FIGS. 1*a* and 1*b*, the input member 2 is moved from the neutral position towards the control position by applying a force to the input member 2 in a direction towards the base member 1. As the input member 2 is moved from the neutral position to the control position, the seal 3 is compressed. After the force is removed from the input member 2, the seal 3 provides a restoring force which causes the input member 2 to return to the neutral position.

The controller 10 may comprise one or more components housed within the sealed internal volume 4. For example, the controller 10 may comprise one or more electronic, electrical, optical, magnetic or mechanical components housed within the sealed internal volume 4. The controller 10 may be configured to produce a control signal when the input member 2 is moved to the control position. The controller 10 may comprise any suitable means for producing the control signal. For example, the controller 10 may comprise one or more sensors configured to detect when the input member 2 has been moved to the control position. In some examples, the seal 3 may be configured to act as a resistor, wherein compression of the seal 3 as the input member 2 is moved to the control position causes a change in the resistance in an electric circuit. A control signal may be produced by the controller 10 in dependence on the change in resistance In some embodiments, the controller 10 may comprise a pressure sensor configured to detect changes in pressure within the sealed internal volume 4. Movement of the input member 2 relative to the base member 1 may effect a change in pressure within the sealed internal volume 4. The controller 10 may be configured to produce a control signal in dependence on a change in pressure detected by the pressure sensor.

In some embodiments, the controller 10 may comprise a proximity sensor, such as an infrared or other suitable optical sensor, configured to detect when the input member 1 is in the control position. The controller 10 may be configured to produce a control signal in dependence on the proximity sensor detecting that the input member 1 is in the control position.

Figure 2A:
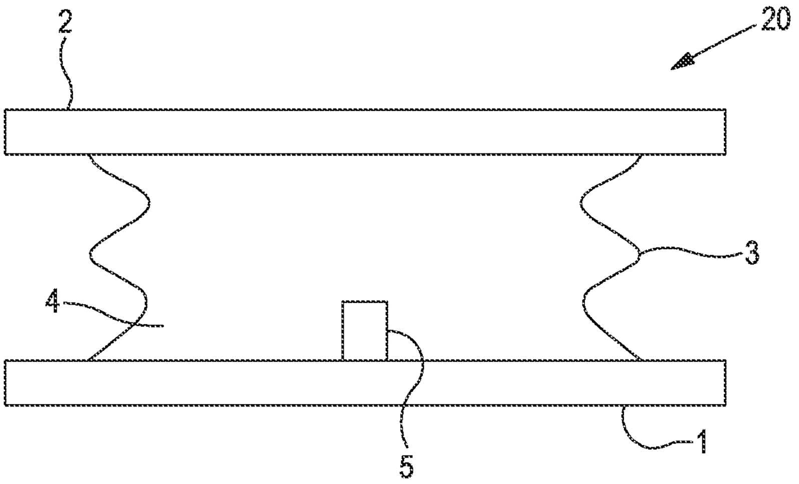
FIGS. 2*a* and 2*b* show schematic cross-sectional side views of a controller according to another embodiment.
Figure 2B:
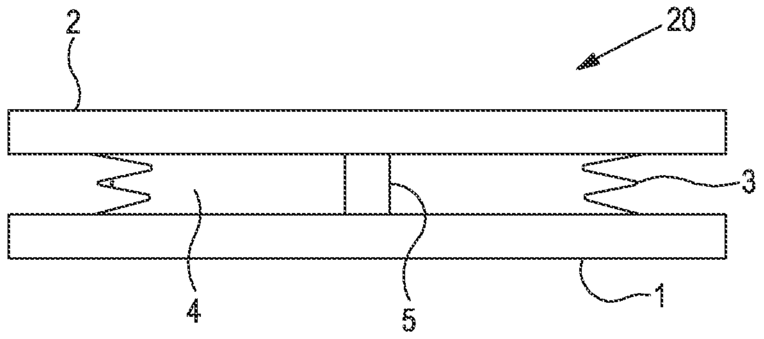

FIGS. 2*a* and 2*b* show schematic cross-sectional side views of a controller 20 for use in a wet environment, such as an ablutionary setting, according to an embodiment. The controller 20 has features in common with the controller 10 of FIGS. 1*a* and 1*b*. Like reference numerals will be used to refer to like features.

In addition to the features of the controller 10 of FIGS. 1*a* and 1*b*, the controller 20 of FIGS. 2*a* and 2*b* comprises an actuation point 5 located within the sealed volume 4. The actuation point 5 is configured to be actuated by moving the input member 2 to the control position. FIG. 2*a* shows the input member 2 in the neutral position and FIG. 2*b* shows the input member 2 in the control position. The seal 3 is configured to bias the input member 2 towards the neutral position.

Figure 3A:
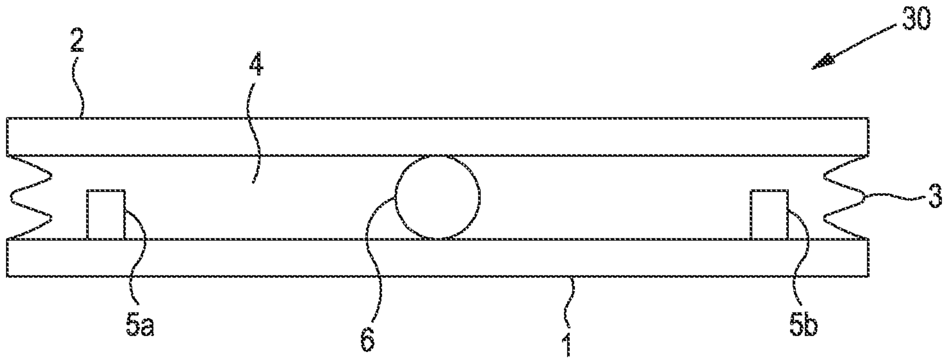
FIGS. 3*a*, 3*b* and 3*c* show schematic cross-sectional side views of a controller according to another embodiment.
Figure 3B:
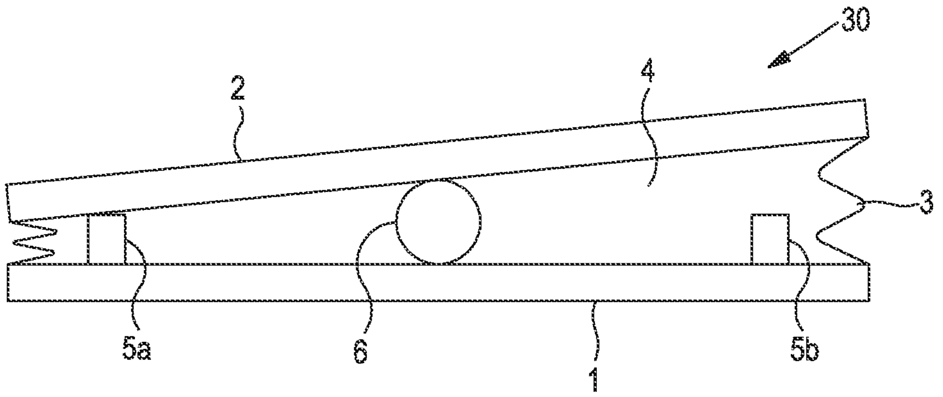
Figure 3C:
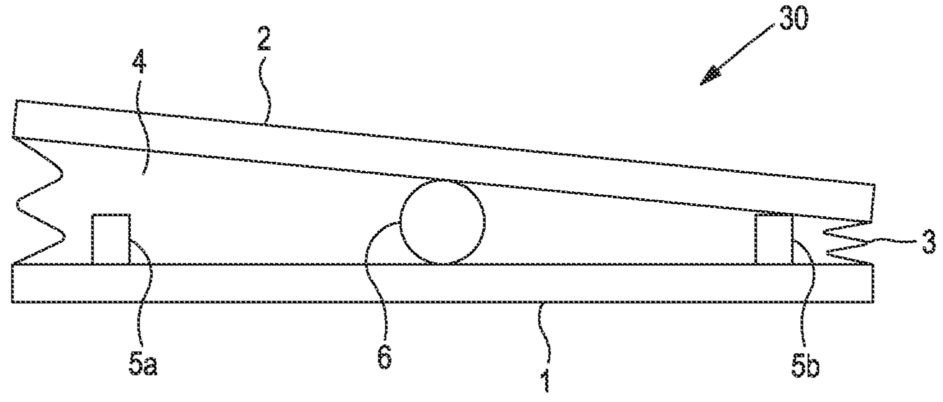

FIGS. 3*a*, 3*b* and 3*c* show schematic cross-sectional side views of a controller 30 for use in a wet environment, such as an ablutionary setting, according to an embodiment. The controller 30 has features in common with the controller 20 of FIGS. 2*a* and 2*b*. Like reference numerals will be used to refer to like features.

In addition to the features of the controller 20 of FIGS. 2*a* and 2*b*, the controller 30 of FIGS. 3*a*, 3*b* and 3*c* comprises a pivot joint 6 which is configured to allow the input member 2 to pivot relative to the base member 1 from the neutral position to two control positions. FIG. 3*a* shows the input member 2 in the neutral position, FIG. 3*b* shows the input member 2 in a first control position, and FIG. 3*c* shows the input member 2 in a second control position. The seal 3 is configured to bias the input member 2 towards the neutral position. The controller 30 further comprises two actuation points 5*a*, 5*b* located within the sealed volume 4. Each of the actuation points 5*a*, 5*b* is configured to be actuated by pivoting the input member 2 to one of the two control positions.

In some embodiments, the pivot joint 6 is configured to allow the input member 2 to pivot relative to the base member 1 about more than one axis. The axes may intersect at a point aligned with the centre of the input member 2 or offset from the centre of the input member 2. The axes may be perpendicular or obtuse to one another. In some embodiments, the pivot joint 6 may be configured to allow the input member 2 to pivot relative to the base member 1 from the neutral position to more than two control positions, for example three or four control positions. In such embodiments, the controller 30 may comprise more than two actuation points 5 located within the sealed volume 4, for example three or four actuation points 5. Each of the more than two actuation points 5 may be configured to be actuated by pivoting the input member 2 to one of the more than two control positions.

In other embodiments, a single actuation point 5 is located within the sealed volume 4. In such embodiments, the pivot joint 6 may be configured to allow the input member 2 to pivot relative to the base member 1 from the neutral position to a single control position, and the single actuation point 5 may be configured to be actuated by moving the input member 2 to the single control position.

In some embodiments, the sealed internal volume 4 of the controller 30 may be divided in to a plurality of sealed chambers. One actuation point may be disposed in each sealed chamber. For example, where the input member 2 is configured to pivot relative to the base member 1 from the neutral position to two control positions, the sealed internal volume 4 may be divided in to two sealed chambers. In another example, where the input member 2 is configured to pivot relative to the base member 1 from the neutral position to four control positions, the sealed internal volume 4 may be divided in to four sealed chambers. The controller 20 may comprise a pressure sensor or a plurality of pressure sensors configured to detect changes in pressure within each of the sealed chambers. Where the controller 20 comprises a single pressure sensor, the pressure sensor may be configured to detect a change in pressure in each of the sealed chambers. Where the controller 20 comprises a plurality of pressure sensors, each of the pressure sensors may be configured to detect a change in pressure in a different one of the sealed chambers. The controller 20 may be configured to produce a different control signal in dependence on which of the sealed chambers a change in pressure is detected in.

In some embodiments, the controller 20 may comprise one or more proximity sensors, such as an infrared or other suitable optical sensor, configured to detect when the input member 1 has been moved to one of the control positions. For example, where the input member 2 is configured to pivot relative to the base member 1 from the neutral position to two control positions, the controller 20 may comprise two proximity sensors. In another example, where the input member 2 is configured to pivot relative to the base member 1 from the neutral position to four control positions, the controller 20 may comprise four proximity sensors. Each of the proximity sensors may be configured to detect when the input member 2 has been moved to a different one of the control positions. The controller 20 may be configured to produce a different control signal in dependence on which of the control positions the input member 2 has been moved to.

One or more of the actuation point(s) 5 of any of the controllers 10, 20 or 30 may be coupled to a mechanical control portion. Actuation of one or more of the actuation point(s) 5 may cause actuation of the mechanical control portion(s). In use, the mechanical control portion(s) may be operable to adjust operation of at least one fluid delivery device such as a faucet or a shower. For example, the mechanical control portion(s) may be operable to control operation of a mechanical valve.

In some embodiments, any of the controllers 10, 20 or 30 may comprise an electrical switch, and one or more of the actuation point(s) 5 of any of the controllers 10, 20 or 30 may comprise an electrical contact of the electrical switch. For example, an actuation point 5 may comprise two electrical contacts of the electrical switch which are biased away from each other. To actuate the actuation point 5, the input member 2 may be moved to the control position to overcome the biasing force between the electrical contacts, for example through contact between the input member 2 and one or both of the electrical contacts, causing the electrical contacts to come into contact with one another. In some examples, the actuation point 5 may comprise a single contact of the electrical switch and the input member 2 may comprise another contact of the electrical switch. To actuate the actuation point 5, the input member 2 may be moved to the control position to cause the electrical contacts to come into contact with one another. In use, the electrical switch may be electrically connected to an electronic valve, such as a solenoid valve. Contact between electrical contacts of the electrical switch may complete an electric circuit which may cause actuation of the electronic valve. In use, the electrical switch may be operable to adjust operation of at least one fluid delivery device such as a faucet or a shower.

Figure 4:
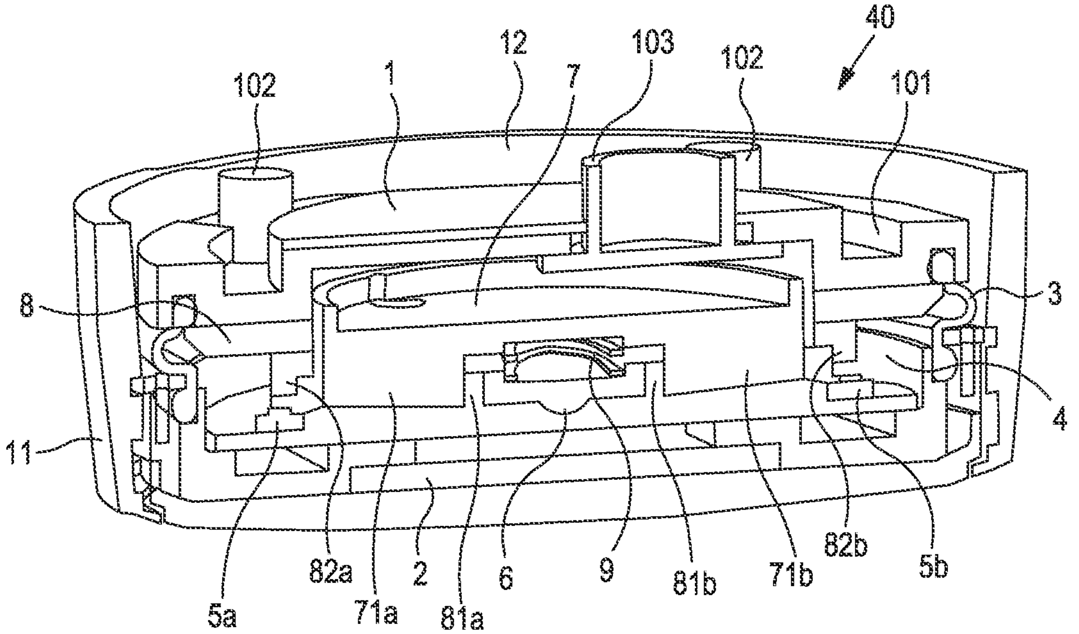
FIG. 4 shows a schematic cross-sectional isometric view of a controller according to another embodiment.

FIG. 4 shows a schematic cross-sectional isometric view of a controller 40 for use in a wet environment, such as an ablutionary setting, according to an embodiment. The controller 40 has features in common with the controller 30 of FIGS. 3*a*, 3*b* and 3*c*. Like reference numerals will be used to refer to like features.

The base member 1 of the controller 40 comprises a circumferential groove 101 for receiving a fixing plate. The fixing plate may be used to attach the controller 40 to a surface, such as a wall, in an ablutionary setting, in use. The base member 1 also comprises a plurality of bosses 102 for receiving fasteners, such as screws, for securing the controller 40 to the surface via the fixing plate. In some embodiments, means other than the fixing plate may be used to attach the controller 40 to the surface. In such embodiments, the groove 101 and the bosses 102 may not be present. The base member 1 also comprises a cable boss 103 for receiving a terminal end of an electrical cable. The electrical cable may provide power to the controller and/or may deliver control signals from the controller to parts of a fluid delivery system in use.

The pivot joint 6 of the controller 40 is configured to allow the input member 2 to pivot relative to the base member 1 from the neutral position to four control positions. FIG. 4 shows the input member 2 in the neutral position. The controller 40 further comprises four actuation points located within the sealed volume 4. Two of the actuation points 5*a*, 5*b* are shown in FIG. 4. Each of the actuation points 5 are configured to be actuated by moving the input member 2 to one of the control positions. In other embodiments, the pivot joint 6 is configured to allow the input member 2 to pivot relative to the base member 1 from the neutral position to more than or fewer than four control positions, for example six control positions or three control positions. In such embodiments, the controller 40 may comprise more than or fewer than four actuation points 5, for example six actuation points or three actuation points. Each of the actuation points 5 may be configured to be actuated by pivoting the input member 2 to one of the control positions.

The controller 40 comprises a first guide portion 7. As shown in FIG. 4, a clearance is provided between the first guide portion 7 and the base member 1 for housing electronic componentry, e.g. comprising a printed circuit board, of the controller 40. The first guide portion 7 comprises four ribs 71*a-d*. Two of the ribs 71*a*, 71*b* are shown in cross-section in FIG. 4. In the embodiment of FIG. 4, the first guide portion 7 is formed separately from the input member 2 and is fixed relative to the input member 2. In other embodiments, the input member 2 and the first guide portion 7 may be formed integrally. The controller 40 further comprises a second guide portion 8. The second guide portion 8 comprises four slots 81*a-d*. Two of the slots 81*a*, 81*b* are shown in cross-section in FIG. 4. In the embodiment of FIG. 4, the second guide portion 8 is formed separately from the base member 1 and is fixed relative to the base member 1. In other embodiments, the base member 1 and the second guide portion 8 may be formed integrally. Each of the ribs 71*a-d* is received in one of the slots 81*a-d* to inhibit lateral and/or rotational movement of the input member 2 relative to the base member 1.

In some embodiments, the first guide portion 7 comprises one or more slots and the second guide portion 8 comprises one or more ribs. In some embodiments, the first guide portion 7 may comprise more than or fewer than four ribs 71 and the second guide portion 8 may comprise more than or fewer than four slots 81. At least one of the ribs may be received in one of the slots to inhibit lateral and/or rotational movement of the input member 2 relative to the base member 1

In the embodiment of FIG. 4, the controller 40 comprises four electrical switches. Each of the actuation points 5*a-d* comprises two electrical contacts of one of the electrical switches. The electrical contacts of each of the electrical switches are biased away from each other. The second guide portion 8 comprises four contact portions 82*a-d*. Two of the contact portions 82*a*, 82*b* are shown in cross-section in FIG. 4. To actuate one of the actuation points 5*a-d*, the input member 2 is moved to one of the control positions such that a force is exerted by one of the contact portions 82*a-d* on one or both of the electrical contacts of one of the electrical switches. The force exerted by the contact portion 82 on the electrical contact(s) overcomes the biasing force between the electrical contacts. This causes the electrical contacts to come in to contact with one another. In other embodiments, each of the actuation points 5*a-d* may comprise a first electrical contact of one of the electrical switches, and each of the contact portions 82*a-d* may comprise a second electrical contact of one of the electrical switches. To actuate one of the actuation points 5*a-d*, the input member 2 is moved to one of the control positions such that the first electrical contact of one of the electrical switches comes into contact with the second electrical contact of the electrical switch. In use, each electrical switch may be electrically connected to an electronic valve, such as a solenoid valve. Contact between electrical contacts of one of the electrical switches may complete an electric circuit which may cause actuation of the electronic valve. In use, the electrical switches may be operable to adjust operation of at least one fluid delivery device such as a faucet or a shower.

Figure 5A:
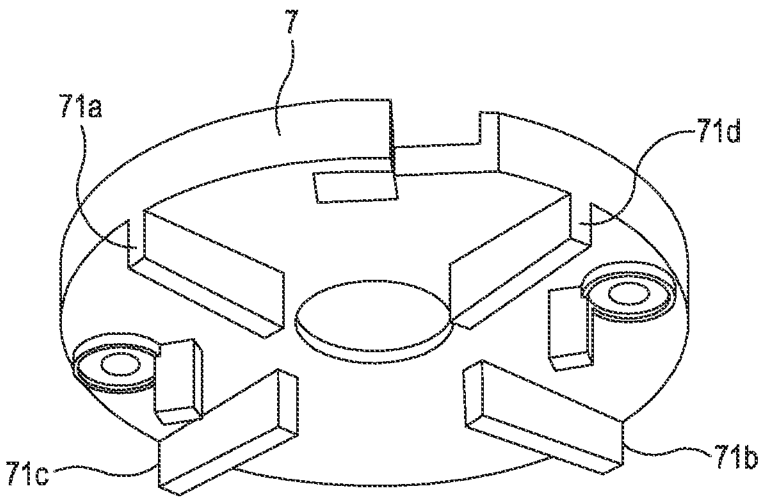
FIG. 5*a* shows a schematic isometric view of a first guide portion of the controller of FIG. 4.
Figure 5B:
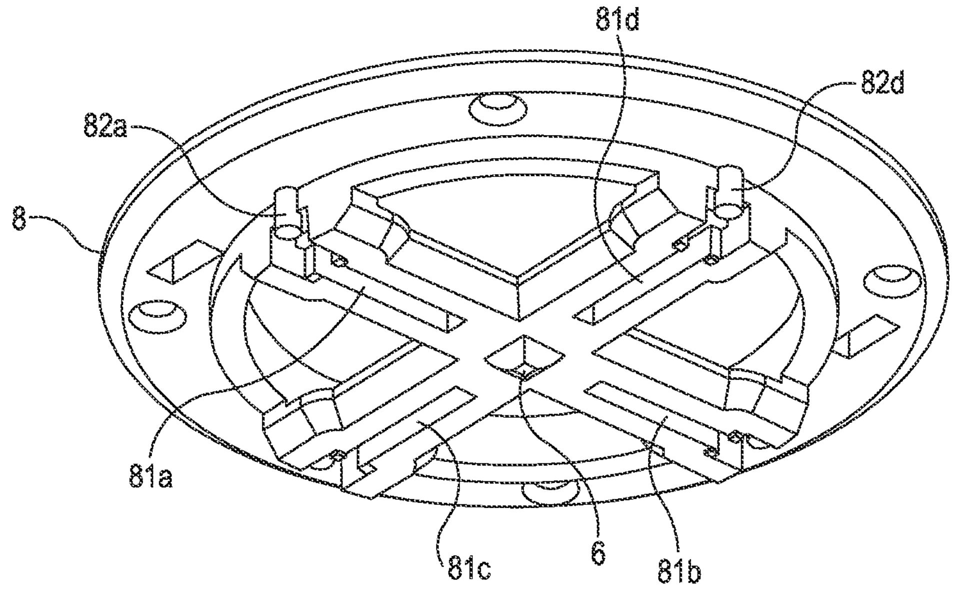
FIG. 5*b* shows a schematic isometric view of a second guide portion 8 of the controller of FIG. 4.

FIG. 5*a* shows a schematic isometric view of the first guide portion 7 of the controller 40. FIG. 5*b* shows a schematic isometric view of the second guide portion 8 of the controller 40. Each of the four ribs 71*a-d* are shown in FIG. 5*a*, and each of the four slots 81*a-d* are shown in FIG. 5*b*. Two of the contact portions 82*a*, 82*d* are shown in FIG. 5*b*. The other two contact portions 82*b*, 82*c* are not visible, but their location is clear from FIG. 5*b*.

The pivot joint 6 of the controller 40 is configured to allow the input member 2 to pivot relative to the base member 1 about two axes. A first one of the two axes extends along a longitudinal axis of a first slot 82*a* of the four slots 82*a-d*, through a pivot point of the pivot joint 6, and along a longitudinal axis of a second slot 82*b* of the four slots 82*a-d*. The pivot point of the pivot joint 6 is aligned with the centre of the input member 2. A second one of the two axes extends along a longitudinal axis of a third slot 82*c* of the four slots 82*a-d*, through the pivot point of the pivot joint 6, and along a longitudinal axis of a fourth slot 82*d* of the four slots 82*a-d*. The two axes extend parallel to one another. Due to both axes passing through the pivot point of the pivot joint 6 and the pivot point of the pivot joint 6 being aligned with the centre of the input member 2, the axes intersect at a point aligned with the centre of the input member 2. This provides a 'North, South, East, West' configuration of the control positions. In other embodiments, the axes may be obtuse to one another.

The controller 40 further comprises a spring 9 configured to further bias the input member 2 towards the neutral position. The spring 9 provides an additional restoring force, in addition to the seal 3, to return the input member 2 towards the neutral position after the input member 2 has been moved towards one of the control positions. In the embodiment of FIG. 4, the spring 9 comprises a wave spring arranged coaxially with the pivot point of the pivot joint 6. In some embodiments, a different type of spring may be provided, such as a compression spring arranged between the base member 1 and the input member 2. In some embodiments, more than one spring may be provided. Any of the controllers 10, 20 and 30 may also comprise one or more springs configured to further bias the input member 2 towards the neutral position.

The controller 40 further comprises a housing 11. The housing 11 comprises an opening 12 which provides access to the input member 2 to enable a user to move the input member 2. The base member 1 is fixed relative to the housing 11 and the input member 2 is moveable relative to the housing 11. In use, the controller 40 may be fixed in position by means of the housing 11, for example by installing the housing within a recess in a wall. In some embodiments, the controller 40 may be fixed in position by means of the base member 1, for example by directly fixing the base member 1 to a wall, or by means of a fixing plate as described above. Any of the controllers 10, 20 or 30 may also comprise a housing 11 comprising an opening 12 providing access to the input member 2.

Figure 6:
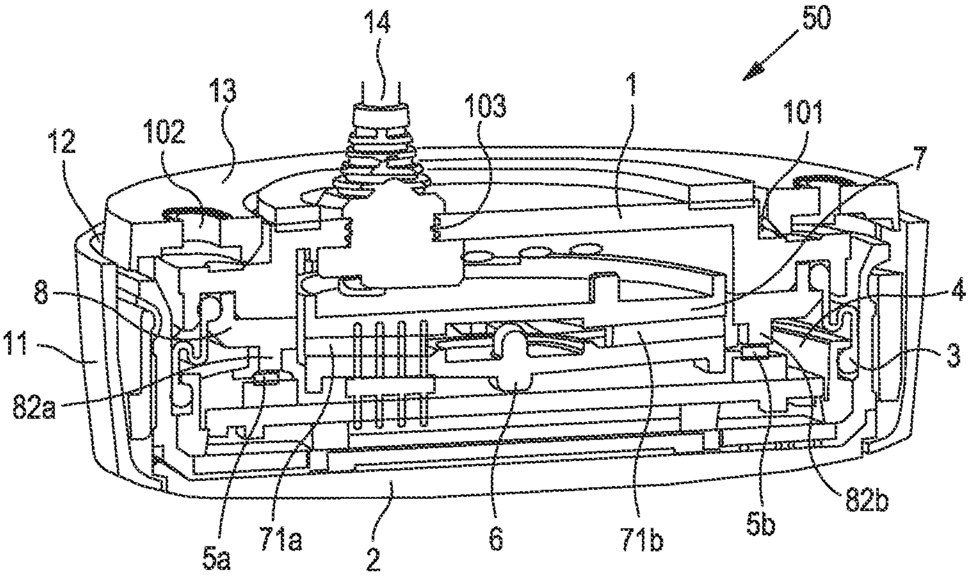
FIG. 6 shows a schematic cross-sectional isometric view of a controller according to another embodiment.

FIG. 6 shows a schematic cross-sectional isometric view of a controller 50 for use in a wet environment, such as an ablutionary setting, according to an embodiment. The controller 50 has features in common with the controller 40 of FIG. 5. Like reference numerals will be used to refer to like features. Some features of the controller 50 are not visible in the view of FIG. 6.

In addition to the features of the controller 40 of FIG. 5, the controller 50 of FIG. 6 comprises a fixing plate 13 received in the groove 101. An electrical cable 14 extends through the cable boss 103. The electrical cable 14 may form part of the controller 50, or may form part of a separate system.

The seal 3 of any of the controllers 10, 20, 30, 40 or 50 may extend continuously in a circumferential direction relative to the base member 1 and the input member 2 to define the sealed internal volume 4. In the embodiments of FIGS. 1-3 and FIG. 6, the seal 3 comprises an S-shaped cross-section. In other embodiments of the controller 10, 20, 30 and 50, the seal 3 comprises a C-shaped cross-section. In the embodiment of FIG. 4, the seal 3 comprises a C-shaped cross-section. In other embodiments of the controller 40, the seal 3 comprises an S-shaped cross-section. The force provided by the seal to bias the input member 2 towards the neutral position may be a result of, at least in part, the cross-sectional shape of the seal 3. The seal 3 of any of the controllers 10, 20, 30, 40 or 50 may comprise a resilient material, for example an elastomer such as a rubber, e.g. an EPDM rubber, a chloroprene rubber, or silicone. The force provided by the seal to bias the input member 2 towards the neutral position may be a result of, at least in part, the material properties of the seal 3.

Figure 7:
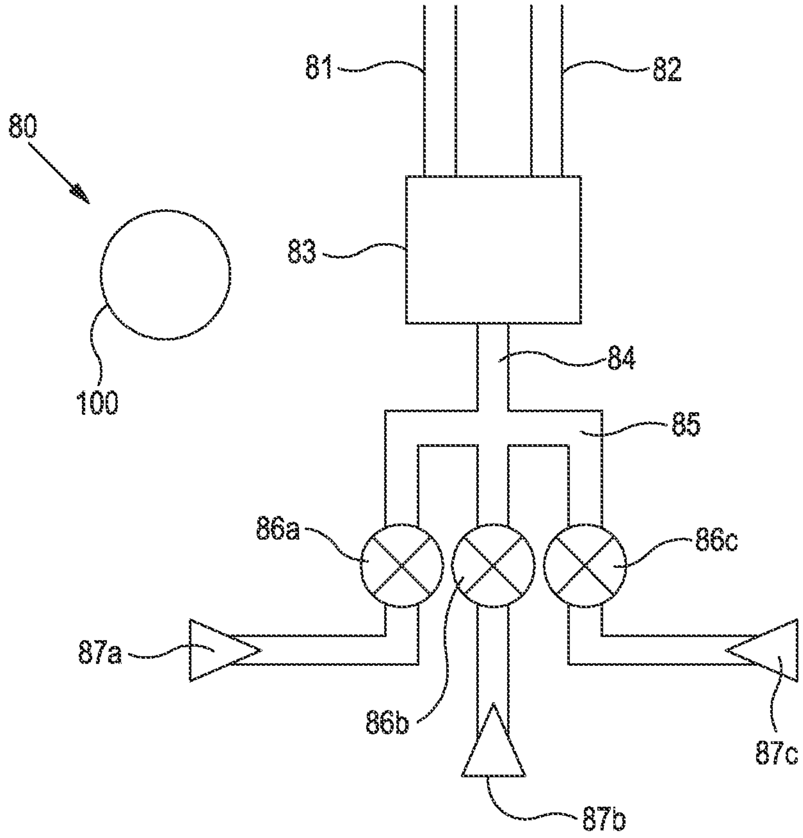
FIG. 7 illustrates schematically a fluid delivery system according to an embodiment.

FIG. 7 illustrates schematically a fluid delivery system 80, for delivering water to a plurality of fluid delivery devices, according to an embodiment. The fluid delivery system 80 comprises a fluid delivery device 87 and a controller 100 according to the present disclosure. The controller 100 is operable to control one or more characteristics of the fluid delivered, in use, by the fluid delivery device 87.

The fluid delivery system 80 further comprises a first supply pipe 81 and a second supply pipe 82. The first supply pipe 81 and the second supply pipe 82 each convey water to a thermostatic mixer valve 83. The first supply pipe 81 carries hot water and the second supply pipe 82 carries cold water or vice versa.

An outlet pipe 84 carries water at a user-desired temperature from the thermostatic mixer valve 84 and communicates with a manifold 85 having three branches. Each branch of the manifold 85 has a shut-off valve 86*a*, 86*b*, 86*c*. In some embodiments, one or more of the shut-off valves 86*a*, 86*b*, 86*c* comprises an electronic valve, such as a solenoid valve. In some examples, one or more branches of the manifold 85 comprise a mechanical shut-off valve 86*a*, 86*b*, 86*c*. A fluid delivery device 87*a*, 87*b*, 87*c* is disposed downstream of each shut-off valve 86*a*, 86*b*, 86*c*. The shut-off valves 86*a*, 86*b*, 86*c* are each operable to permit or prevent flow to the fluid delivery device 87*a*, 87*b*, 87*c* downstream thereof.

The fluid delivery devices 87*a*, 87*b*, 87*c* may for example include a plurality of shower sprayheads and/or may include a plurality of spray modes, e.g. provided by different sets of nozzles, from a shower sprayhead.

The fluid delivery system 80 further comprises a controller 100 according to the present disclosure, for example any one of the controllers 10, 20, 30, 40 or 50. Operation of the system 80 is controlled by the controller 100. In the example of FIG. 6, the input member 2 of the controller 100 is moveable between a neutral position and three control positions. The controller 100 comprises three actuation points 5*a-c* each configured to be actuated by moving the input member 2 to one of the three control positions.

In some embodiments, the controller 100 may comprise three electrical switches and each of the shut-off valves 86*a*, 86*b*, 86*c* may comprise an electronic valve, such as a solenoid valve. Each of the three electrical switches may be controlled by moving the input member 2 to one of the control positions as described above with reference to controllers 10, 20, 30, 40 and 50. In such embodiments, each of the electrical switches is operably connected, either by a wired connection or a wireless connection, to one of the shut-off valves 86*a*, 86*b*, 86*c*. By moving the input member 2 to one of the control positions, one of the three electrical switches can be controlled to cause one of the shut-off valves 86*a*, 86*b*, 86*c* to open, thereby selecting a desired fluid delivery device 87*a*, 87*b*, 87*c*.

In some embodiments, one or more of the actuation points 5*a-c* may be mechanically coupled to a mechanical control portion. Actuation of the one or more of the actuation point(s) 5*a-c* may cause actuation of the mechanical control portion(s). In such embodiments, one or more of the shut-off valves 86*a*, 86*b*, 86*c* comprises a mechanical valve. By moving the input member 2 to one of the control positions, one of the mechanical control portions can be actuated to open a given one of the shut-off valves 86*a*, 86*b*, 86*c*, thereby selecting a desired fluid delivery device 87*a*, 87*b*, 87*c*.

The controller 100 may be operable to control the thermostatic mixer valve 84, by electrical or mechanical means as described above, in order to control the temperature and/or flow rate of water delivered to one or more of the fluid delivery devices 87*a*, 87*b*, 87*c*.

A controller as disclosed herein may be employed to control any one or more fluid, e.g. water, characteristics associated with a fluid delivery system such as an ablutionary system.

The seal of the controller may extend continuously in a circumferential direction relative to the base member and the input member.

The seal of the controller may have a C-shaped or S-shaped cross-section when the input member is in the neutral position.

The seal of the controller may comprise a resilient material.

The spring of the controller may be a wave spring arranged coaxially with a pivot point of the pivot joint.

The controller may include a spring configured to further bias the input member towards the neutral position.

The controller may include a housing, where the base member is fixed relative to the housing and the input member is moveable relative to the housing, and the housing comprises an opening providing access to the input member.

While the example embodiments have been described as being suitable for use in an ablutionary setting, it should be understood that they may be suitable for use in wet environments other than an ablutionary setting.

It will be understood that various modifications and improvements can be made without departing from the concepts disclosed herein. Except where mutually exclusive, any of the features may be employed separately or in combination with any other features and the disclosure extends to all combinations and sub-combinations of one or more features disclosed herein.

The invention claimed is:

1. A controller comprising:

a base member;

an input member moveable relative to the base member between a neutral position and a control position;

a seal extending between the input member and the base member;

a sealed internal volume defined at least partially by the base member, the input member and the seal; and a first guide portion comprising a rib and a second guide portion comprising a slot, wherein the first guide portion is fixed relative to one of the base member and the input member, the second guide portion is fixed relative to the other of the base member and the input member, and the rib is received in the slot to inhibit lateral and/or rotational movement of the input member relative to the base member;

wherein the seal biases the input member towards the neutral position.

2. The controller of claim 1, comprising a pivot joint about which the input member pivots relative to the base member from the neutral position to the control position.

3. The controller of claim 2, wherein the input member pivots about the pivot joint relative to the base member from the neutral position to a plurality of control positions.

4. The controller of claim 3, wherein the plurality of control positions are spaced equidistantly from one another.

5. The controller of claim 2, wherein the input member pivots about the pivot joint relative to the base member about more than one axis.

6. The controller of claim 5, wherein the axes intersect at a point aligned with the center of the input member, or the axes intersect at a point offset from the center of the input member.

7. The controller of claim 1, comprising an actuation point located at least partially within the sealed internal volume, wherein the actuation point is actuated by moving the input member to the control position.

8. The controller of claim 3 comprising a plurality of actuation points located at least partially within the internal volume, wherein each actuation point is actuated by pivoting the input member to one of the plurality of control positions.

9. The controller of claim 7, wherein the actuation point is mechanically coupled to a mechanical control portion.

10. The controller of claim 7, comprising an electronic switch, wherein the actuation point comprises an electrical contact of the electronic switch.

11. The controller of claim 10, wherein the actuation point comprises two electrical contacts of the electronic switch, the two electronic contacts being biased away from one another, wherein movement of the input member to the control position overcomes a biasing force between the two electronic contacts.

12. The controller of claim 1, wherein the base member comprises a guide portion and the input member comprises a guide portion, and one of the guide portion of the base member and the guide portion of the input member comprises a rib, and the other of the guide portion of the base member and the guide portion of the input member comprises a slot, wherein the rib is received in the slot to inhibit lateral and/or rotational movement of the input member relative to the base member.

13. A fluid delivery system, comprising:

a fluid delivery device; and a controller comprising:

a base member;

an input member moveable relative to the base member between a neutral position and a control position;

a seal extending between the input member and the base member;

a sealed internal volume defined at least partially by the base member, the input member and the seal; and a first guide portion comprising a rib and a second guide portion comprising a slot, wherein the first guide portion is fixed relative to one of the base member and the input member, the second guide portion is fixed relative to the other of the base member and the input member, and the rib is received in the slot to inhibit lateral and/or rotational movement of the input member relative to the base member;

wherein the seal biases the input member towards the neutral position;

wherein the controller is operable to control one or more characteristics of the fluid delivered, in use, by the fluid delivery device.

14. The fluid delivery system according to claim 13, wherein the one or more characteristics of the fluid comprise fluid flow and/or temperature.

15. The fluid delivery system according to claim 13 comprising a valve operable to control flow of fluid to the fluid delivery device, wherein the controller is operable to control the valve.

16. The fluid delivery system according to claim 13 comprising a plurality of fluid delivery devices.

17. The fluid delivery system according to claim 16, wherein the controller is configured to permit a user to select any combination of one or more of the fluid delivery devices.

18. The fluid delivery system according to claim 13, wherein the system is coupled to a fluid supply.

19. A controller comprising:

an selectively moveable input member, the input member being moveable between a neutral position and a control position;

a seal associated with the input member;

a sealed internal volume defined at least partially by the input member and the seal; and a first guide portion comprising a rib and a second guide portion comprising a slot, wherein the first guide portion is fixed relative to one of the base member and the input member, the second guide portion is fixed relative to the other of the base member and the input member, and the rib is received in the slot to inhibit lateral and/or rotational movement of the input member relative to the base member;

wherein the seal biases the input member towards the neutral position.

* * * * *